Aug. 22, 1967

R. WEINGER 3,337,771

ELECTRICAL APPARATUS

Filed Nov. 18, 1964

INVENTOR.
RALPH WEINGER
BY
Nelson E. Kimmelman
ATTORNEY

Aug. 22, 1967  R. WEINGER  3,337,771
ELECTRICAL APPARATUS
Filed Nov. 18, 1964  2 Sheets-Sheet 2

INVENTOR.
RALPH WEINGER
BY
Nelson E. Kimmelman
ATTORNEY

United States Patent Office 3,337,771
Patented Aug. 22, 1967

3,337,771
ELECTRICAL APPARATUS
Ralph Weinger, Laverock, Pa., assignor, by mesne assignments, to Harvey Hubbell, Incorporated, Bridgeport, Conn., a corporation of Connecticut
Filed Nov. 18, 1964, Ser. No. 412,054
14 Claims. (Cl. 317—14)

This invention relates to a condition-sensing system and in particular to an electrical system for detecting a change in a predetermined differential between two or more currents. The present invention has particular utility in providing a safety device which can respond to a circuit fault having a relatively low magnitude and/or a fault having a considerably greater magnitude.

For many industrial as well as domestic applications, it is highly desirable to provide protection against circuit abnormalities or excesses such as overloads, short circuits, and current leakages to ground. Very often devices that are quite effective for protection against heavy overloads or short circuits are insensitive to minor overloads, shorts or current leakage. In addition, many protective circuits include numerous components which add to their complexity and increase cost and the likelihood of maintenance problems.

It is therefore an object of the present invention to provide a system which is responsive to very small as well as larger abnormal circuit conditions.

Another object of the invention is to provide a simple and inexpensive system for circuit protection which is responsive to very small abnormal circuit conditions.

Still another object of the present invention is to provide a protective circuit with a low number of components thereby minimizing cost and reliability problems.

Other objects of the present invention will be apparent to those skilled in the art upon perusal of the drawings, specification and claims herein.

In accordance with the present invention there is provided a protective circuit which includes a very sensitive saftety switch and a substantially less sensitive safety switch both operable in response to magnetic fields created by undesired current changes. In one form of the invention both switches are located directly in the magnetic field of a transformer which produces net magnetic fields in response to predetermined undesired unbalanced current conditions existing in the associated circuit to be protected. In another form imbalance between certain currents in the circuit to be protected is detected by an additional flux coil associated with the transformer. If the imbalance, though slight, is sufficient to actuate the very sensitive switch, the latter is arranged to provide energization for the less sensitive switch which thereupon cuts off the power to the protected load. A feature of the invention in one form is the use of AC to actuate a reed switch. Other features include novel arrangements for reopening or resetting the reed or other very sensitive switches after one cycle of operation has been completed.

Figure 1:
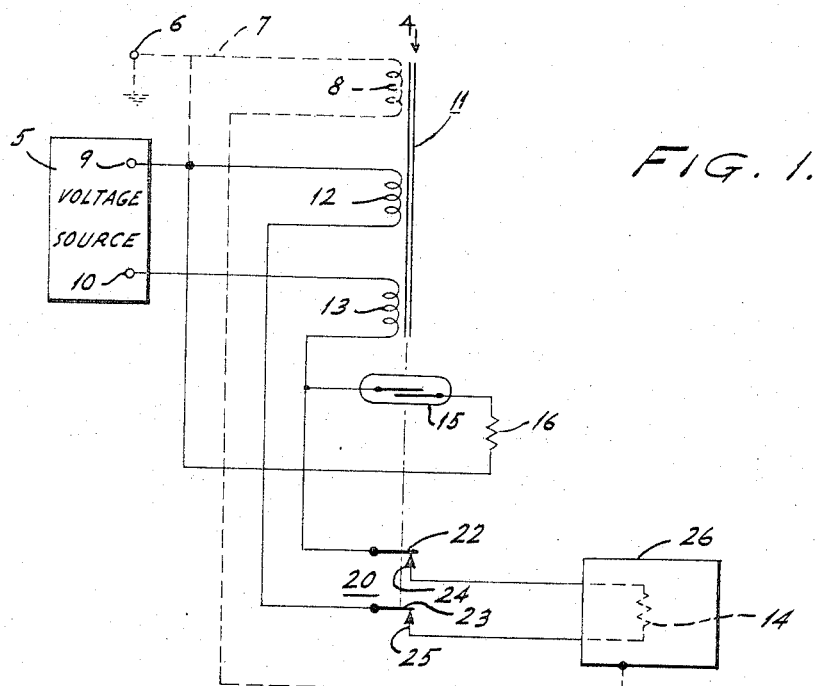
FIGURE 1 is a schematic circuit diagram of this invention in one form.

Referring to FIGURE 1 there is shown a circuit which embodies the principles of the present invention in one form. In the circuit there is a transformer indicated generally at the numeral 4 which has a core 11 of magnetic material around which are wound windings 12 and 13. As shown, it is seen that each of the windings is in series with one lead to the load indicated by the resistor 14. (Another winding 8 is shown in broken lines connected to terminal 6 and to housing 26 by lead 7 which is also shown as a broken line. The use of winding 8 in this way is an alternate modification of the overall system of FIG. 1 which will be discussed later.) The windings 12 and 13 are so disposed about the core that when the circuit to the load is functioning normally, the respective fields produced in core 11 by each winding cancel one another. The windings 12 and 13 are connected to terminals 9 and 10 of a voltage source 5.

It will be seen that since two switches 15 and 20 are located directly in the flux path of the transformer any net magnetic field existing in the core 11 will effect them both. The switch 15 is a very sensitive magnetic switch which will respond to very slight differential magnetic fields within core 11 whereas the switch 20 is substantially less sensitive. However, when the differential flux in core 11 is sufficient to operate the very sensitive switch 15, at least part of the current through winding 13 will be diverted through resistor 16 and thence to the input terminal 9. As a result, the winding 12 will be substantially by-passed so that it will produce a very small magnetic field in core 11 whereas the coil 13, which is now effectively across the input terminals 9 and 10, produces a relatively very large magnetic field of a magnitude sufficient to latch switch 15 closed and operate the switch 20 which may be a circuit breaker. The switch 20 has arms 22 and 23 and contacts 24 and 25 respectively in series with leads to the load 14. This switch is normally closed and is built to respond only when the differential field in core 11 is relatively strong whether that field is initially very weak (but strong enough to operate switch 15) or is originally strong because of an overload or "short" in the load circuit. Thus this circuit has a kind of feedback or bootstrap operation that enables it to be triggered by predetermined small imbalances. In either case, the contacts of switch 20 will open and power to the load 14 will thereupon be cut off.

Figure 2:
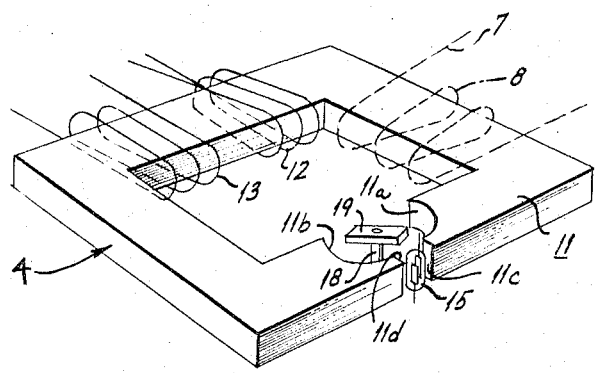
FIGURE 2 is a perspective view of some components that may be used in the circuit of FIG. 1.

FIGURE 2 shows one form which the transformer and switch combination shown in FIGURE 1 may take. It includes a core 11 of magnetic material around which are wound windings 12 and 13. In the diagram of FIG. 1, the windings 12 and 13 were located in series with the leads to either side of the load 14. In that embodiment they were so wound and arranged that when the load circuit was functioning normally, the magnetic fields produced by these windings cancelled one another. The core 11 is formed with arcuate end segments 11a and 11b as shown in FIG. 2. The core also has flat, parallel terminal portions 11c and 11d. There is located in the space between the segments 11c and 11d a very sensitive magnetic switch such as a reed switch 15 which responds rapidly when even a small disparity develops in the currents traversing the windings 12 and 13 respectively. Such disparity gives rise to a differential or net magnetic field in the space between segments 11c and 11d and thereby closes the contacts of switch 15. As explained previously, the closing of the switch 15 by-passes input current around one of the windings with the result that a much larger imbalance in the currents traversing the windings is produced with the result that their net field is strong enough to actuate the substantially less sensitive switch 20. As shown in FIG. 2, the switch 20 comprises a rotary bar 19 made of a magnetic material mounted on a non-conductive shaft 18.

Figure 3:
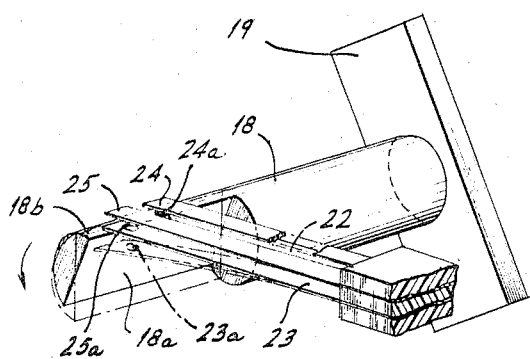
FIGURE 3 is an enlarged perspective view of details of the apparatus shown in FIGS. 1 and 2.

FIG. 3 discloses that the shaft 18 has a lower portion which has a cross-section slightly smaller than half of the cross-section of the upper shaft portion. This lower portion includes the flat portion 18a and adjacent curved surface 18b. The lower contact arms 22 and 23 are made of a suitable conductive resilient material such as a springy metal and their free ends normally rest upon the surface 18b near its junction with surface 18a. In this position, their respective contacts including 23a respectively touch the contacts 24a and 25a of the upper arms 24 and 25 which may be substantially the same as arms 22 and 23 except for dimensional differences. When the imbalance between the currents in windings 12 and 13 becomes sufficiently large, due to action of the switch 15 or otherwise, the bar 19 is rotated so that the arms 22 and 23 spring downward to engage the flat surface 18a thereby losing contact with the arms 24 and 25 and de-energizing the load resistor 14.

Of course, a number of variations of this form of the invention are possible. For example, the switches 15 and 20 could both be of the rotor type except that the shaft 18 of the latter could be attached to a helical spring against whose bias the shaft 18 would have to turn. Alternatively a friction member could be arranged to bear against the shaft of the less sensitive switch in order to limit the response of the latter to larger net or differential magnetic fields in the core.

Also, while the provision of arcuate core end portions is advantageous they are not indispensable. The transformer could be made to have conventional flat and parallel ends between which the sensitive and less sensitive switches could both be disposed. As a matter of fact, no particular core configuration is requisite; the main consideration is that both switches be loctaed so as to be directly subjected to differential magnetic fields produced by the transformer.

While the form of the invention shown in FIG. 1 has been explained in terms of a transformer having two windings, it is likewise adaptable to a stystem having a transformer on which a third winding such as winding 8 is disposed as shown in FIG. 1. As shown, the terminal 6 is connected to the ground terminal of the voltage source 5, although there are other possible systems which employ three windings but do not ground one lead to the additional winding. The other end of the winding 8 is conductively attached, as by soldering, to a conductive housing 26 in which the load resistor 14 is enclosed.

Windings 8, 12 and 13 are so arranged in this form that the current through winding 13 sets up a magnetic field in core 11 which opposes and effectively cancels the sum of opposing magnetic fields produced by the currents traversing windings 12 and 8. Ordinarily the current through winding 8 will be negligible representing "sneak path" leakage within the housing 26. In this arrangement, if a slight unbalance in the net core fields arises because of current leakage to ground external to housing 26 and not via the wires attached to coil 8, the very sensitive switch will first be actuated and the operation of the circuit will be substantially identical to that of the two winding system first explained.

The invention in this form is also applicable with three or more winding systems used with 220 volt, three-wire systems and other wiring arrangements wherein unbalance in the net differential field is responsible for actuation of both switches located in the direct flux path of the transformer.

Figure 4:
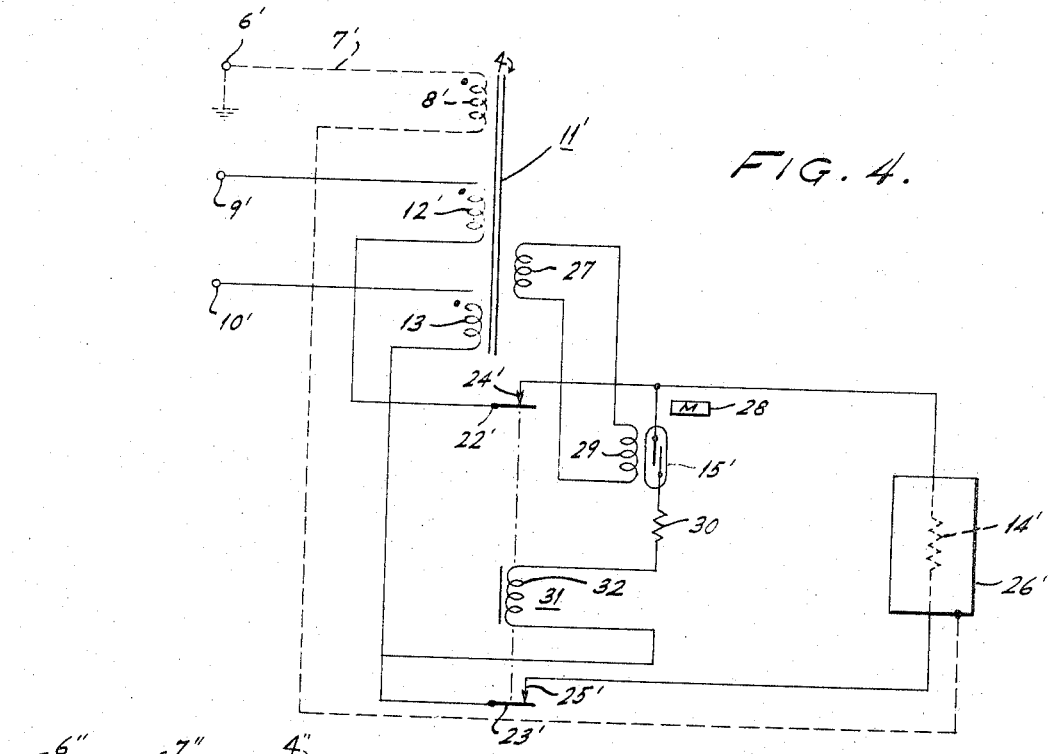
FIGURE 4 is a schematic diagram of another circuit embodying another form of this invention.

FIG. 4 shows still another form that the invention may take. In this circuit, a secondary winding is used to actuate the sensitive switch indirectly so that there is no need to provide a specal transformer core configuration to accommodate it. Instead, an auxiliary secondary winding 27 is wound around the core and currents generated therein also pass through a second auxiliary winding 29 to create a magnetic field in proximity to the very sensitive switch 15'. In this figure as in all other figures, components which are essentially the same are denoted by the same numerals which are appropriately primed, either singly or doubly. To increase the sensitivity of the switch 15', a bias magnet 28 may be employed which is insufficient, in tself, to actuate the switch 15' but, in conjuncion with the field produced by a slight current through winding 27 in the proper direction, does trip and latch it.

Upon actuation of switch 15', current from input terminal 9' passes through winding 12', switch contacts 22' and 24', switch 15', reisstor 30, coil 32 of relay 31, and through winding 13' to input terminal 10'. When coil 32 is energized it magnetically opens switch contact pairs 22', 24' and 23', 25' to deenergize the load circuit. The switch 15' is latched into closed position by virtue of the action of the bias magnet 28. Thus, the contact pairs 22', 24' and 23', 25' will also remain open and the load 14' will remain unenergized.

To reset the protective circuit, the contact pairs 22', 24' and 23', 25' are manually or mechanically closed whereupon there will be a current surge through the reed contacts of switch 15' producing a magnetic field which causes them to reopen, assuming that the unbalanced condition which initially actuated the reed switch has been corrected. If not, the switch 15' will again close and the same deenergization action as before will follow. As in the circuit of FIG. 1, a third winding 8' may be used, connected between ground and the housing 26' of the load 14'.

Figure 5:
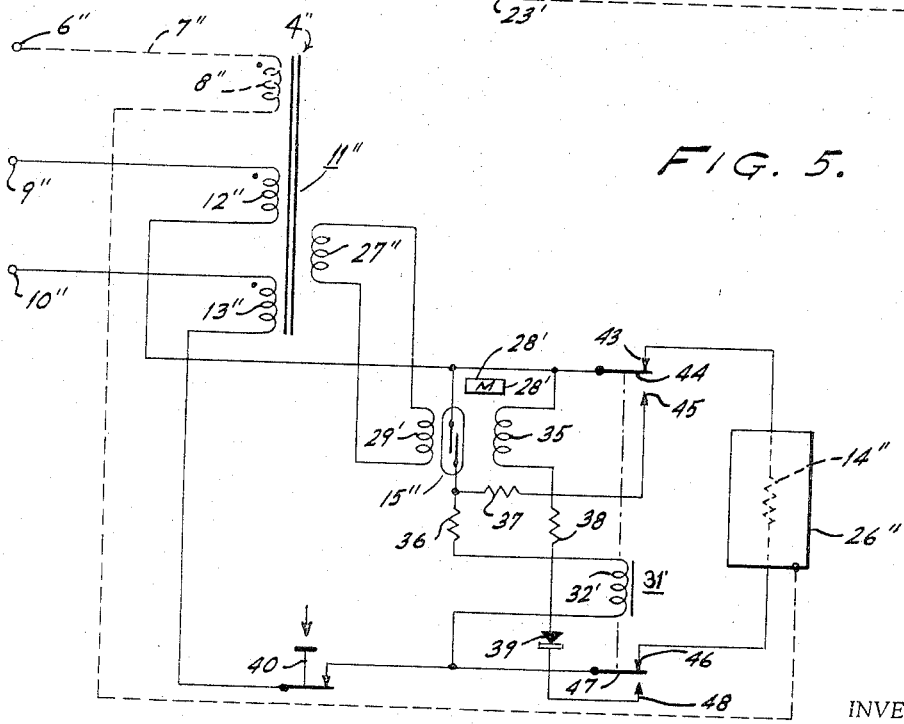
FIGURE 5 is a schematic diagram of still another circuit embodying another form of this invention.

FIGURE 5 shows still another form of the present invention. As in the circuit of FIG. 4, there is a secondary winding 27' and an auxiliary coil 29' in proximity to a sensitive reed switch 15'' which is biased by magnet 28'. As in the previous circuit also, a net imbalance existing between the magnetic fields produced by the primary coils thereof will be reflected as a current passing through the auxiliary coil 29' which thereupon will close switch 15'' and the latter will be latched into that position by the action of the magnet 28'. With switch 15'' closed, current will flow through the winding 12'', resistor 36, coil 32' of relay 31' (which is of the double-pole, double-throw type), normally closed pushbutton 40 and winding 13'' to input terminal 10''. Since the relay coil 32' is energized, it will cause the arms 44 and 47 thereof to be disengaged from contacts 43 and 46 respectively and instead, touch contacts 45 and 48. This action deenergizes load 14'' and closes a first sub-circuit which includes coil 35, resistor 38, diode 39 (when the polarization of the signal is appropriate), and pushbutton 40. The current flow through coil 35 generates a bucking magnetic field through switch 15'' which opposes the latching field produced by magnet 28' and is strong enough to re-open its contacts.

At the same time, a second sub-circuit is closed when the arm 44 engages contact 45. Current will then flow through resistors 36 and 37 in series with the relay coil 32'. The values of the resistors 36 and 37 are so chosen that there will be a low current passing through this sub-circuit which is sufficient to keep the relay coil 32' energized which thereby keeps contacts 44, 45 and 47, 48 engaged despite the opening of the reed switch 15''. If the input power from terminals 9 and 10 is subsequently cut off, or if the reset pushbotton 40 is pressed so as to open it, the relay coil 32' will become deenergized and the arms 44 and 47 will respectively re-engage contacts 43 and 46. Thus power will again be applied to the load 14'' unless, of course, the field imbalance still exists in the primary coils of the transformer 11'' in which case it will again act to deenergize the load circuit.

It should be realized that the protection afforded by this circuit not only extends to the load circuit but also to human beings (and other living creatures) who might inadvertently touch the "hot" lead to the load and thus provide a path to "ground" through their bodies. In this case, the currents passing through the windings 12 and 13 will be unequal and thus the protective circuit will be activated.

As other modifications and applications of the present invention, which do not depart from the essence thereof, will occur to one skilled in the art upon perusing the drawings and specification, the invention should be limited only by the claims herein.

I claim:
1. A protective circuit for a load circuit comprising: core means of magnetically permeable material; output terminal means for connection to said load circuit; a plurality of input windings associated with said core means and adapted to be coupled between an alternating current input circuit and said output terminal means to produce respective alternating magnetic fields in said core means; highly sensitive mechanical first switching means responsive to a resultant of said magnetic fields; latching means responsive to momentary closure of said first switching means to hold said first switching means in its closed position; less sensitive second switching means connected in series with at least one of said output terminals; and actuating means operable by said first switching means to open said second switching means to uncouple said load circuit from said input circuit.

2. The circuit of claim 1 wherein said first switching means is disposed within the magnetic field of said core means.

3. The circuit of claim 2 wherein said actuating means comprises a movable magnetically permeable member disposed within the magnetic field of said core means and wherein said latching means comprises a bypass circuit around at least one of said input windings to increase the amplitude of said resultant field.

4. The circuit of claim 1 wherein said first switching means is a reed switch and wherein said latching means is a biasing magnet adjacent said reed switch.

5. The circuit of claim 1 wherein said actuating means is a relay coil.

6. The circuit of claim 1 wherein said first switching means is responsive to the output of a secondary winding on said core means.

7. A protective circuit for a load circuit, comprising:
(a) a core of magnetically permeable material,
(b) a plurality of input windings adapted to be coupled to an input circuit for energization thereby, said input windings being wound about said core and producing, when energized, respective magnetic fields therein,
(c) first switching means disposed to be traversed by the magnetic fields in said core and being responsive to the existence of a predetermined differential between said fields,
(d) second winding means also being disposed to be traversed by said fields in said core, said second switching means being coupled to said input circuit, to said first switching means, and to output terminals across which said load circuit may be connected, said second means being responsive to the actuation of said first means whereupon said second means decouples said load circuit from said input circuit, said first switching means being considerably more sensitive to said magnetic fields in said core than said second switching means.

8. A protective circuit according to claim 7 wherein said first switching means responds to a weak net magnetic field within said core which is insufficiently strong in itself to magnetically actuate said second switching means and wherein said first switching means when actuated by said weak field operates to produce in said core a considerably stronger magnetic field sufficient to actuate magnetically said second switching means.

9. A protective circuit according to claim 7 wherein said core has pole pieces and wherein said first and second switching means are disposed to be threaded by magnetic flux between said pole pieces.

10. The protective circuit according to claim 9 wherein said pole pieces have arcuate portions between which at least part of said second switching means is disposed and also have flat portions between which at least part of said first switching means is disposed.

11. A protective circuit for a load comprising:
(a) a core made of a magnetically permeable material,
(b) a first winding on said core and being connected to a first input terminal,
(c) a second winding on said core and connected to a second input terminal, said first and second windings being energized by an input circuit adapted to be connected across said first and second input terminals,
(d) a secondary winding associated with said core,
(e) a coil coupled to said secondary winding,
(f) a first switching means of the double pole-single throw type having a first pair of contacts connected to said first and second windings and a second pair of contacts connected to output terminals across which said load may be connected, said first switching means also including a solenoid, said first switching means normally being closed to enable energization of said output terminals from said input terminals when the net magnetic field produced within said core by said first and second windings is substantially negligible,
(g) a second switching means having one contact thereof connected to one of said output terminals and constructed to be actuated by a magnetic field produced by said coil when the net magnetic field within said core reaches a predetermined intensity,
(h) a resistance element coupled to the other contact of said second switching means and to said solenoid for limiting current through said solenoid upon closure of said second switching means, said closure thereupon enabling energization of said solenoid whereupon said first switching means opens to deenergize said output terminals.

12. A protective circuit for a load circuit, comprising:
(a) a core of magnetically permeable material,
(b) at least two input windings associated with said core each having a first terminal coupled to a different input terminal to said protective circuit, said input terminals being adapted to be coupled to an input circuit for energization thereby, said input windings being wound about said core to produce, when energized, respectively opposite magnetic fields therein,
(c) a secondary winding associated with said core,
(d) a first coil coupled to said secondary winding,
(e) a first switching means magnetically coupled to magnetic fields in said first coil, said first switching means having a first terminal thereof coupled to the second terminal of a first of said input windings,
(f) a first resistance means coupled to a second terminal of said first switching means,
(g) a double-pole, double-throw relay having a solenoid coupled to said first resistance means and to the second terminal of a second of said input windings, said relay having two movable arms, a first of which is coupled to said first terminal of said first switching means and the second of which is coupled to said second terminal of said second one of said input windings, said relay also having a first set of two contacts which correspond to one another, one contact being for each pole thereof, said first set being respectively coupled to two output terminals across which said load is to be connected, said relay also having a second set of two corresponding contacts, one for each pole thereof,
(h) a second resistance means coupled between the one of said second set of contacts which is associated with said first arm and said second terminal of said first switching means, and
(i) a sub-circuit coupled between said first terminal of said first switching means and the one of said second set of contacts which is associated with said second arm, said sub-circuit including
(1) a second coil in proximity to said first switching means, and
(2) a unidirectional current conducting device in series therewith.

13. A protective circuit for a load, comprising:
(a) a first winding having a first terminal thereof coupled to a first input terminal,
(b) a second winding having a first terminal thereof coupled to a second input terminal, said first and second windings being arranged to produce, in response to energization by an input circuit adapted to be coupled to said input terminals, magnetic fields of opposing polarities,
(c) a relay which includes:
  (i) a first contact member coupled to a second terminal of said first winding,
  (ii) a second contact member coupled to a first output terminal, said first and second contact members being constructed to make or break contact,
  (iii) a third contact member coupled to a second terminal of said second winding,
  (iv) a fourth contact member coupled to a second output terminal, said output terminals being adapted to be connected to a load circuit to be protected,
  (v) a solenoid having one terminal thereof coupled to said second terminal of said second input winding,
(d) a magnetically-actuated switch having one terminal coupled to said first output terminal and its second terminal coupled to a second terminal of said solenoid, and
(e) inductive means in proximity to said input windings and adapted to be magnetically coupled thereto and also being magnetically coupled to said switch for actuating the latter in response to a predetermined difference between the intensities of said magnetic fields, whereupon said magnetically actuated switch enables said relay to be actuated and said load circuit thereby is uncoupled from said input circuit.

14. A protective circuit for a load circuit comprising:
(a) a core made of a magnetically-permeable material,
(b) first and second windings about said core and being adapted to be connected to an input circuit for energization thereby, said first and second windings being constructed to produce substantially equal and opposite magnetic fields within said core under normal current conditions in said load circuit,
(c) first magnetically-actuated switching means disposed to be traversed and actuated by a net magnetic field of a predetermined first intensity produced within said core by said first and second windings,
(d) second magnetically-actuated switching means disposed to be traversed and actuated in response to a net magnetic field produced within said core by said windings which has a predetermined second intensity considerably greater than said first intensity, said second switching means when not actuated coupling said input circuit to output terminals across which said load circuit may be connected, said first switching means when actuated by said first intensity field providing a redistribution of currents in said plurality of windings which is considerably more unbalanced than the current distribution therethrough just prior to said actuation thereof whereupon the resultant net magnetic field in said core attains said second intensity thereupon actuating said second switching means, said second switching means thereupon decoupling said output terminals from said input circuit.

References Cited

UNITED STATES PATENTS 3,187,225   6/1965   Mayer _____ 317—27 X

MILTON O. HIRSHFIELD, *Primary Examiner.*

J. D. TRAMMELL, *Assistant Examiner.*

UNITED STATES PATENT OFFICE
CERTIFICATE OF CORRECTION

Patent No. 3,337,771                                                          August 22, 1967

Ralph Weinger

It is hereby certified that error appears in the above numbered patent requiring correction and that the said Letters Patent should read as corrected below.

Column 3, line 31, for "loctaed" read -- located --; line 36, for "stystem" read -- system --; column 4, line 2, for "tself" read -- itself --; same line 2, for "conjuncion" read -- conjunction --; line 7, for "reisstor" read -- resistor --; column 5, line 48, for "winding" read -- switching --.

Signed and sealed this 20th day of August 1968.

(SEAL)
Attest:

Edward M. Fletcher, Jr.                                            EDWARD J. BRENNER
Attesting Officer                                                     Commissioner of Patents